United States Patent [19]
Biancardi et al.

[11] 3,876,959
[45] Apr. 8, 1975

[54] REGENERATIVE LASER SYSTEM

[75] Inventors: Frank R. Biancardi, South Windsor; Abraham Landerman, Mansfield, both of Conn.; Gorken Melikian, Springfield, Mass.

[73] Assignee: United Aircraft Corporation, East Hartford, Conn.

[22] Filed: July 11, 1974

[21] Appl. No.: 487,517

[52] U.S. Cl.............................. 331/94.5 G; 330/4.3
[51] Int. Cl............................................. H01s 3/22
[58] Field of Search...................... 331/94.5; 330/4.3

[56] References Cited
UNITED STATES PATENTS
3,668,549   6/1972   Biancardi et al................... 331/94.5

*Primary Examiner*—Robert J. Webster
*Attorney, Agent, or Firm*—Robert C. Walker

[57] ABSTRACT

Regenerative apparatus for exhausting the working medium from the optical cavity of a laser and for supplying preheated diluent to the reaction chamber of a laser is disclosed. In an aftercooler thermal energy is exchanged between the working medium exhausted from the optical cavity and a cryogenic coolant which is subsequently utilized as the motive fluid for an ejector and as a diluent in the production of laser gas. Highly toxic and corrosive gases are condensed out of the working medium as the cryogenic coolant is evaporated and superheated. A preheater transfers additional heat to the diluent before the diluent enters the reaction chamber.

6 Claims, 1 Drawing Figure

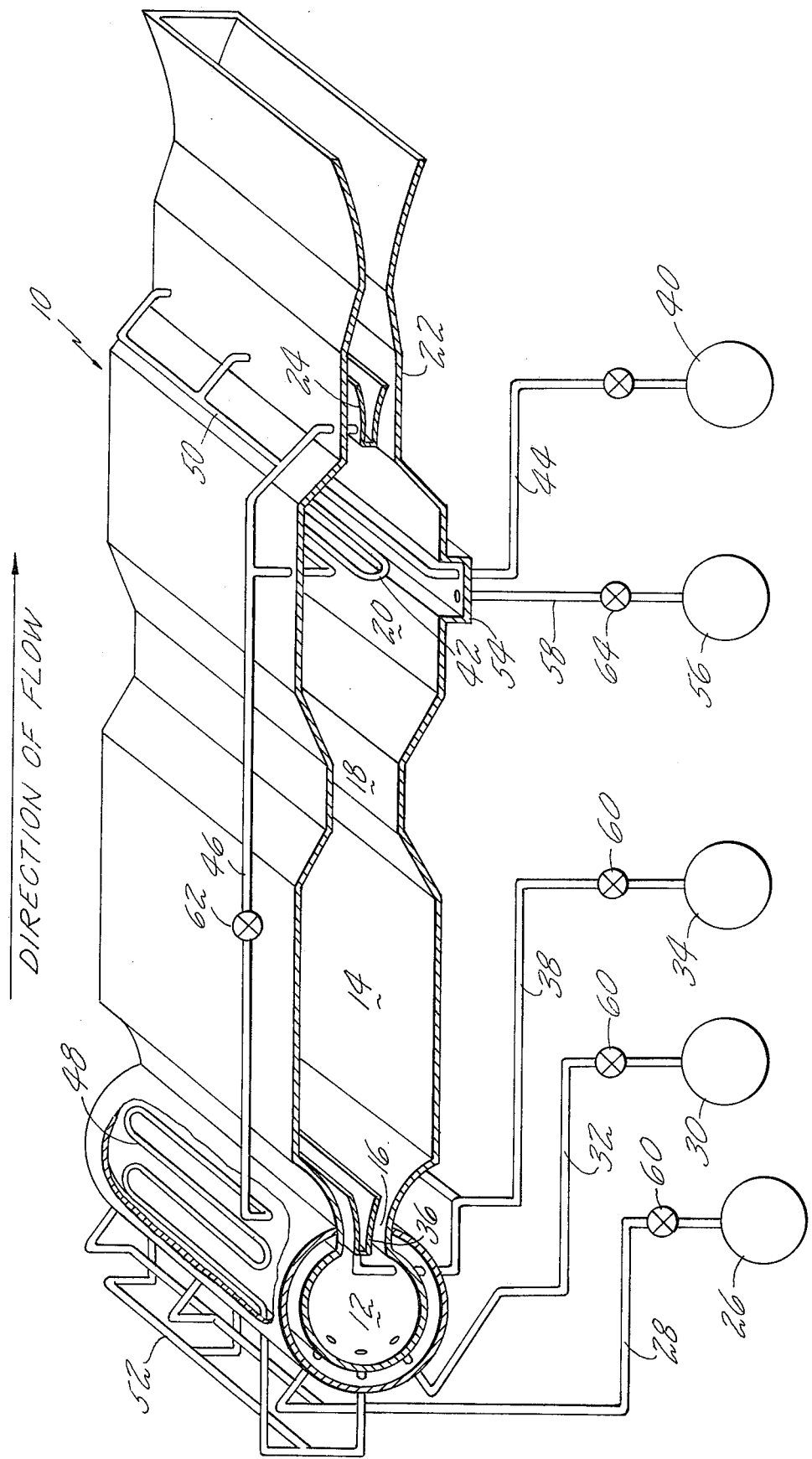

REGENERATIVE LASER SYSTEM

BACKGROUND OF THE INVENTION

1. Field of the Invention

This invention relates to lasers and more particularly to open cycle gas lasers operating at subatmospheric pressures.

2. Description of the Prior Art

It is known in the chemical laser field that a population inversion in a laser gas can be established by reacting an excess quantity of a first primary gas with a second primary gas in a reaction chamber to yield dissociated atoms of the first primary gas as a constituent of the effluent from the chamber, and subsequently combining the dissociated atoms from the chamber with a secondary reactant gas to yield excited molecules of a lasing species.

A typical chemical laser employing the above technology is described in Bronfin, et al., U.S. Pat. No. 3,701,045 in which an excess of molecular fluorine is added to molecular hydrogen in a mole ratio of approximately two and one-half to one. The hydrogen and the fluorine chemically react to produce an effluent comprising molecules of hydrogen fluoride and dissociated atoms of fluorine. The temperature produced by the reaction of the two primary reactants ranges between 2500° to 3500° Rankine causing essentially all of the excess fluorine molecules supplied to dissociate into fluorine atoms.

A diluent such as nitrogen is commonly added to the reaction chamber to reduce the partial pressure of the fluorine gas as the fluorine atoms are dissociated. This reduction in the partial pressure of the fluorine isolates the fluorine atoms from one another and lowers the collisional recombination rate of the atoms. In a typical chemical laser the diluent comprises 50 to 70 percent of the gas composition within the reaction chamber.

The recombination rate of fluorine atoms is further reduced by freezing the fluorine in the atomic or free atom condition. The effluent from the reaction chamber is cooled to a temperature of about 560° Rankine by very rapidly expanding the gas mixture across an aerodynamic nozzle. As the temperature of the fluorine is reduced, the vibrational activity and the accompanying random collisions of the free fluorine atoms are diminished. A secondary reactant gas, deuterium, is added during expansion of the effluent in a quantity in excess of the number of fluorine atoms. The deuterium immediately reacts with the free fluorine atoms to yield excited deuterium fluoride molecules which constitute the laser gas utilized for photon emission within the optical cavity. The nitrogen, the excited deuterium fluoride, the hydrogen fluoride and the excess deuterium are the principal gases comprising the working medium as the working medium leaves the secondary reaction site.

The cooled diluent within the working medium absorbs a significant portion of the heat generated by the reaction of the deuterium with the atomic fluorine. The relaxation rate of excited deuterium fluoride molecules is temperature and pressure dependent and is retarded to permit the lasing species to be distributed throughout the optical cavity. Cooling of the deuterium fluoride molecules and lowering the pressure of the gas reduces the probability of random collisions which result in a reduction of the energy level of the deuterium fluoride molecules through premature photon emission.

Even with diluent cooling the lifetime of the deuterium fluoride molecules in the excited state remains very short, approximately fifty milliseconds, and the excited molecules must be rapidly brought into the optical cavity before the population inversion becomes dissipated. In a typical embodiment described by Bronfin et al. the working medium entering the optical cavity has a Mach number of approximately four to five. In order to establish supersonic velocities and maintain low pressures, on the order of ten torr within the optical cavity, exhaust gases must be evacuated from the cavity at a high rate.

In at least one embodiment a compressor has been used to evacuate the optical cavity. Biancardi et al describes such a system, although not employed with a chemical laser, in U.S. Pat. No. 3,641,453. A compressor driven by a prime mover evacuates the optical cavity by raising the pressure of the working medium exiting the cavity to a pressure above atmospheric conditions. The prime mover which supplies the external power in Biancardi et al. is not shown, however, any prime move such as an electric motor is suitable.

This patient also discloses the use of a primary reactant as the coolant in a heat exchanger located in the exhaust stream of the laser in order to reduce the exhaust temperature and, thereby, improve the effectiveness of the compressor. All the embodiments are open cycle systems in which a cryogenic primary reactant or a supplemental cooling fluid is exhausted directly to the atmosphere whenever the cooling required in the aftercooler exceeds the quantity of primary reactant required by the laser.

A low pressure laser system in which coolant gases are exhausted directly to the atmosphere is heavy since a compressor and a prime mover are required. To be highly portable the fixed weight of a laser system must be minimized, and improved means for evacuating the optical cavity must be found. Continuing efforts are directed to overall improvements in system efficiency and effective utilization of the consumable gases.

SUMMARY OF THE INVENTION

A primary object of the present invention is to improve the overall efficiency of a laser system through a reduction in the size and weight of the laser components and a reduction in the rate of consumption of stored fluids during operation. Another object is to remove toxic and corrosive constituents from the working medium after the working medium is exhausted from the optical cavity.

According to the present invention a substantial quantity of the toxic and corrosive gases present in the working medium exhausted from the optical cavity of a laser is condensed in an aftercooler by a cryogenic coolant supplied from a storage container, and the remaining working medium is cooled in the aftercooler and evacuated by an exhaust ejector which employs the cryogenic coolant as the motive fluid for the ejector, the cryogenic coolant having been evaporated and superheated in the aftercooler by the hot gases exhausted from the optical cavity; the amount of cryogenic coolant evaporated and the temperature to which the working medium is cooled are balanced so that the amount of cryogenic coolant evaporated is substantially equal to the amount of motive fluid required to raise the pressure of the working medium to atmospheric pressure from a condition at which the temperature is below the condensation temperature of the toxic and corrosive gases.

A primary feature of the present invention is the matched flow rates of coolant through the aftercooler and motive fluid through the ejector. A further feature is the regenerative exchange of thermal energy between the working medium exhausted from the optical cavity and the motive fluid for the ejector and between the working medium and a diluent present during the production of the laser gas. A diluent preheater transfers additional heat to the diluent before the diluent enters the reaction chamber. Also, the highly toxic and corrosive gases present in the working medium are removed by condensation before the working medium is released into the atmosphere.

A principal advantage of the present invention is the reduction in the size and weight of the components required to maintain a low pressure within the gain region of a laser. Also, a requirement for exhaust scrubbing apparatus is reduced or eliminated. The use of cryogenic coolants reduces the quantity of stored consumables required for operating the laser.

The foregoing and other objects, features and advantages of the present invention will become more apparent in the light of the following detailed description of the preferred embodiment thereof as illustrated in the accompanying drawing.

BRIEF DESCRIPTION OF THE DRAWING

The FIGURE is a simplified perspective view showing the cross section of a laser in accordance with the present invention.

DESCRIPTION OF THE PREFERRED EMBODIMENT

A laser 10 in which a laser gas is produced by the reaction of two or more constituents is shown in the FIGURE. An initial chemical reaction takes place in a reaction chamber 12 which opens to an optical cavity 14 through a primary supersonic nozzle 16. A supersonic diffuser 18 connects the optical cavity to an aftercooler 20. An exhaust ejector 22 having a fluid nozzle 24 is located immediately downstream from the aftercooler.

Fluorine is contained within a fluorine storage vessel 26 which is connected to the reaction chamber by a fluorine supply manifold 28. Hydrogen is contained within a hydrogen storage vessel 30 which is connected to the reaction chamber by a hydrogen supply manifold 32. Deuterium is contained within a deuterium storage vessel 34 which is connected to the secondary supersonic nozzles 36 by a deuterium manifold 38. Cryogenic nitrogen is contained within a nitrogen storage vessel 40 which is connected to cooling coils 42 within the aftercooler by a coolant supply manifold 44. A nitrogen manifold 46 connects the cooling coils in the aftercooler with a diluent supply preheater 48 located in the wall of the reaction chamber and with a motive fluid supply manifold 50. The diluent preheater is connected to the reaction chamber by a diluent supply manifold 52. A condensate sump 54 is located at the bottom of the aftercooler and is joined to a contaminant tank 56 by a drainage manifold 58. Control valves 60 regulate the supply of reactants to the reaction chamber and the secondary supersonic nozzle. A regulating valve 62 controls the amount of diluent supplied to the reaction chamber from the cooling coils in the aftercooler. A contaminant control valve 64 prevents the escape of highly toxic and corrosive gases from the contaminant tank when the laser is not in operation.

During the production of the laser gas in the hydrogen fluoride/deuterium fluoride chemical laser the first primary reactant gas, fluorine ($F_2$), and the second primary reactant gas, hydrogen ($H_2$), chemically react in the presence of the diluent, nitrogen ($N_2$), within the reaction chamber to produce atomic fluorine (F) and hydrogen fluoride (HF) according to the simplified reaction shown below.

$$2F_2 + H_2 \rightarrow 2HF + 2F + \text{Heat}$$

In order to produce atomic fluorine the temperature at the primary reaction site must be approximately 2,500° to 3,500° Rankine. The greater the average temperature at the primary reaction site the more likely all the fluorine gas atoms will become dissociated. Heat escaping from the reaction chamber wall is absorbed by the diluent circulating through the preheater 48 in the chamber wall and is returned to the chamber with the entering diluent. This regenerative process raises the temperature of the diluent to reduce preliminary cooling by the diluent at the primary reaction site before substantially all of the fluorine atoms have been dissociated.

The effluent from the reaction chamber is rapidly expanded through the primary supersonic nozzle 16 and the secondary reactant, deuterium ($D_2$), is added to the reactant stream through the secondary supersonic nozzle 36. A secondary reaction promptly produces excited deuterium fluoride molecules (DF*) according to the simplified reaction shown below.

$$D_2 + 2F \rightarrow 2DF^* + \text{Heat}$$

The heat produced at the secondary reaction site is partially absorbed by the nitrogen which was expanded and cooled to approximately 560° Rankine as the effluent from the reaction chamber passed through the primary supersonic nozzle 16.

The excited deuterium fluoride molecules have a relatively short relaxation time, on the order of 50 milliseconds, and are quickly brought from the secondary reaction site into the optical cavity. The reaction products comprising the working medium are accelerated within the primary and secondary supersonic nozzles in one embodiment to a Mach number between four and five at entrance to the optical cavity. Heat produced by friction between the working medium and the optical cavity wall and heat generated by the production of excited deuterium fluoride molecules cause a deceleration of the working medium to a Mach number of approximately two and one half to three at the cavity exit. In order to maintain a quantity of excited deuterium fluoride molecules within the optical cavity which is sufficient to support the lasing process, the portion of working medium containing depleted deuterium fluoride molecules must be evacuated from the optical cavity.

The exhaust ejector in combination with the supersonic diffuser evacuates the optical cavity. The supersonic diffuser partially recovers the static pressure from the working medium which enters the diffuser at a high velocity. The exhaust ejector pumps the working medium from the recovered static pressure to atmospheric pressure. The effectiveness of the ejector is enhanced by precooling or condensing the working medium within an aftercooler before the working medium reaches the ejector. The cooling fluid for the aftercooler is cryogenic nitrogen supplied from the nitrogen storage vessel. Nitrogen is evaporated and superheated in the aftercooler and manifolded to the ejector where the super-heated gas is utilized as the motive fluid for the ejector.

The use of an ejector as an exhaust pumping means permits utilization of a special relationship between the temperature of the noncondensed working medium and capacity of the pump to elevate the noncondensed portion of the working medium to atmospheric pressure. The pressure ratio across the ejector is essentially proportional, over the normal operating range of the ejector, to the mass flow rate of the motive fluid and the square root of the motive fluid temperature divided by the exhaust gas temperature, $$P_R \sim \dot{w}_{N_2} \sqrt{T_{N_2}/T_{EG}}$$

where:

$P_R$ is the pressure ratio across the ejector;

$\dot{w}_{N_2}$ is the mass flow rate of the motive fluid through the ejector which is also the mass flow rate of the cryogenic coolant through the aftercooler;

$T_{N_2}$ is the temperature of the motive fluid entering the ejector which is also the temperature of the cryogenic coolant exiting the aftercooler; and $T_{EG}$ is the temperature of the noncondensed exhaust gases leaving the aftercooler and entering the ejector.

As the temperature of the exhausted gases leaving the aftercooler ($T_{EG}$) is reduced, the mass flow rate of the motive fluid required to achieve the same pressure rise across the ejector is also reduced. However, as is shown in the aftercooler heat balance equation which follows, an increase in the mass flow rate of the motive fluid or an increase in the temperature of the motive fluid is required to reduce the temperature of the exhaust gases leaving the aftercooler. It is these special relationships which primarily make it possible for the laser of the preferred embodiment to have improved overall efficiency through a reduction in the size and weight of the laser components and through an optimized rate of consumption of stored fluids during operation.

$$\dot{w}_{N_2} [ c_{N_2} (T_{N_2} - T_{N_2\ in}) + \Delta h_{N_2} ] = [ \dot{w}_{WM} c_{WM} (T_{WM\ in} - T_{EG}) + \dot{w}_{CG} \Delta h_{CG} ]$$

where:

$c_{N_2}$ is the specific heat of nitrogen;

$T_{N_2\ in}$ is the temperature of the nitrogen coolant entering the aftercooler;

$\Delta h_{N_2}$ is the heat of vaporization of nitrogen;

$\dot{w}_{WM}$ is the mass flow rate of the working medium entering the aftercooler;

$c_{WM}$ is the specific heat of working medium entering the aftercooler;

$T_{WM\ -\ in}$ is the temperature of the working medium entering the aftercooler;

$w_{CG}$ is the mass flow rate of the condensed gases; and $\Delta h_{CG}$ is the heat of condensation of the condensed gases.

In the preferred embodiment the temperature of the exhaust gases exiting the aftercooler ($T_{EG}$) is selected within the range 200° to 300° Rankine to insure that substantially all of the highly toxic and corrosive deuterium fluoride and hydrogen fluoride are condensed out of the working medium. An optimum weight and cost heat exchanger capable of cooling the working medium to that temperature is then provided within the aftercooler.

In the optimum heat exchanger the temperature of the cooled exhaust gas ($T_{EG}$) is balanced with the mass flow rate of motive fluid evaporated in the heat exchanger ($\dot{w}_{N_2}$) so that the amount of coolant consumed is substantially equal to the amount of motive fluid required by the ejector. A range of heat exchangers may effect this balance as is shown by the pressure ratio expression previously described and wherein the mass flow rate of the motive fluid required is inversely proportional to the square root of the motive fluid temperature. The greater the elevation of the motive fluid temperature within the aftercooler the lesser the quantity of motive fluid needed by the laser during operation.

The specific heat exchanger for the preferred embodiment is selected after comparing the amounts and temperatures of motive fluids which can be produced by heat exchangers of differing size, weight, material and complexity.

Although the heat balance relationships have been described for simplicity purposes without reference to the diluent requirements of the reaction chamber, the amount of coolant evaporated in the aftercooler is increased to provide the required amount of diluent.

The working medium is cooled to a temperature of approximately 200° to 300° Rankine within the aftercooler 20 to condense substantially all of the highly toxic and corrosive hydrogen fluoride and deuterium fluoride constituents of the exhaust gas. The condensate is subsequently drained to a sump 54 in the bottom of the aftercooler. The hydrogen and deuterium fluoride condensate is bled from the sump through a control valve 64 to a contaminant tank 56 where it is stored. The removal of the toxic and corrosive constituents of the exhaust gas in the aftercooler precludes the requirement for additional scrubbing components and therein effects a reduction in size and weight of the laser system.

The use of cryogenic liquid coolant is particularly desirable for cooling within the aftercooler of a laser. The large temperature differential between the coolant in the coils of the heat exchanger and the passing exhaust gases establishes elevated rates of heat transfer. In addition the low temperature of the cryogenic coolant increases the capability for absorbing heat from the passing exhaust gases over that which would be absorbed by a like quantity of noncryogenics. The reduced quantity of coolant required and the relatively small heat exchanger employed reduces the overall system size and weight.

Although the chemical laser of the preferred embodiment has been described with respect to hydrogen, fluorine, and deuterium reactants and with respect to a nitrogen diluent, other suitable reactants and diluents may be utilized. Similarly, the cryogenic coolant and the exhaust ejector system of the present invention have been described with respect to a chemical laser, however, the concepts are suitable for use with any open cycle laser operating at subatmospheric pressure, including the open cycle carbon dioxide laser system described in Biancardi, et al.

Although the invention has been shown and described with respect to a preferred embodiment thereof, it should be understood to those skilled in the art that the foregoing and other changes and omissions in the form and detail thereof can be made without departing from the spirit and the scope of the invention.

Having thus described a typical embodiment of our invention, that which we claim as new and desire to secure by Letters Patent of the United States is:

1. In a regenerative laser system, an optical cavity at a first pressure and, leading from the optical cavity, an exhaust duct including an aftercooler for cooling the working medium within the duct and for evaporating a liquid cryogenic coolant and further including an ejector driven by the evaporated coolant for pumping the working medium from the first pressure of the optical cavity to a second pressure, the heat exchanger area of the aftercooler being sufficient to evaporate an amount of fluid which is substantially equal to the amount of motive fluid required by the ejector to maintain the first pressure within the optical cavity.

2. The invention according to claim 1 wherein means for superheating the evaporated cryogenic coolant within the aftercooler is provided.

3. In regenerative apparatus for improving the system efficiency of a flowing gas laser which has an exhaust duct leading from the optical cavity:
   means for maintaining the static pressure of the working medium in the optical cavity at a first pressure and including,
   an ejector positioned within the exhaust duct and having a motive fluid nozzle;
   an aftercooler located upstream of the ejector for transferring thermal energy from the working medium to a cryogenic coolant, the heat exchanger area of the aftercooler being sufficient to evaporate and superheat an amount of cryogenic fluid substantially equal to the amount of fluid required by the ejector nozzle to maintain the static pressure;
   a cryogenic storage vessel for supplying a flow of coolant through the aftercooler; and
   conduit means for flowing the cryogenic from the storage vessel to the aftercooler and from the aftercooler to the ejector nozzle.

4. The invention according to claim 3 having a reaction chamber upstream of the optical cavity for production of the laser gas and further including:
   means for supplying a diluent consisting of evaporated cryogenic to the reaction chamber comprising,
   a diluent preheater for transferring thermal energy escaping from the reaction chamber to the diluent thereby returning the thermal energy to the chamber; and
   a conduit means for flowing evaporated cryogenic from the aftercooler to the preheater and from the preheater to the reaction chamber.

5. A method for exhausting the working medium from the optical cavity of a laser system which has, leading from the optical cavity, an exhaust duct containing an ejector positioned downstream from an aftercooler, comprising the steps of:
   evaporating a cryogenic coolant by flowing the cryogenic through the coolant side of the aftercooler;
   pumping the working medium through the exhaust duct with an ejector utilizing the evaporated cryogenic as the motive fluid;
   cooling the working medium passing through the exhaust duct to a temperature between 200° and 300° Rankine; and
   adjusting the flow rate of cryogenic through the coolant side of the aftercooler to cool the working medium to a temperature at which said flow rate maintains a pressure rise of 100 to 750 torr across the ejector.

6. The invention according to claim 5 including, after the step of evaporating a cryogenic coolant by flowing the cryogenic through the coolant side of the aftercooler, the further step of superheating the coolant by flowing the cryogenic through the coolant side of the aftercooler.

* * * * *